United States Patent [19]
Satran et al.

[11] Patent Number: 5,904,450
[45] Date of Patent: May 18, 1999

[54] CUTTING INSERT WITH A ROUNDED CORNER

[75] Inventors: Amir Satran, Kfar Vradim; Frumkin Josef, Nahariya, both of Israel

[73] Assignee: Iscar Ltd, Migdal Tefen, Israel

[21] Appl. No.: 08/870,716

[22] Filed: Jun. 6, 1997

[30] Foreign Application Priority Data

Jul. 5, 1996 [IL] Israel ......................................... 118797

[51] Int. Cl.⁶ .................................................. B23B 27/22
[52] U.S. Cl. ............................................ 407/113; 407/116
[58] Field of Search ................................... 407/113, 114, 407/116

[56] References Cited

U.S. PATENT DOCUMENTS

| | | | |
|---|---|---|---|
| 3,934,319 | 1/1976 | Schuler | 29/95 R |
| 5,006,020 | 4/1991 | Roos | 407/113 |
| 5,207,748 | 5/1993 | Katbi et al. | 407/114 |
| 5,226,761 | 7/1993 | Satran et al. | 407/114 |
| 5,246,315 | 9/1993 | Hansson et al. | 407/114 |
| 5,382,118 | 1/1995 | Satran et al. | 407/113 |
| 5,437,522 | 8/1995 | Satran et al. | 407/114 |

FOREIGN PATENT DOCUMENTS

| | | |
|---|---|---|
| 0 366 111 | 2/1990 | European Pat. Off. . |
| 951624 | 3/1964 | United Kingdom . |

*Primary Examiner*—Andrea L. Pitts
*Assistant Examiner*—Mark Williams
*Attorney, Agent, or Firm*—Pennie & Edmonds LLP

[57] ABSTRACT

A cutting insert (1) for use in a milling cutter for a face milling has upper, lower and side surfaces and at least one pair of main and minor cutting edges (10, 11) formed by the intersection between the upper surface (5) and an adjacent side surface (7). The cutting edges (10, 11) merge via a cutting corner portion (12) of a relatively large radius, which is provided with a land (15) formed at the upper surface (5) of the insert. The land (15) is inclined to the insert lower surface at an inclination angle which continuously varies from a negative value at an area of the corner portion (12) adjacent the main cutting edge (10) to a positive value at an area of the corner portion (12) adjacent the minor cutting edge (11).

10 Claims, 4 Drawing Sheets

CUTTING INSERT WITH A ROUNDED CORNER

FIELD OF THE INVENTION

The present invention refers to a cutting insert for use with a milling cutter, in particular a face milling cutter. The cutting insert is of the kind having a main and a minor cutting edge such that, during a cutting operation, the main cutting edge is oriented transversely to a workpiece face and operates for peripheral cutting of the workpiece and the minor cutting edge is oriented substantially parallel to the workpiece face and serves as a wiper for finishing the face surface.

BACKGROUND OF THE INVENTION

In face milling operations, in particular of engine blocks made of cast iron and having a width of their face surface less than the diameter of a face milling cutter, there exists a so-called 'frittering' or 'chipping' problem connected with the fact that an uncut portion of the workpiece adjacent the workpiece edge, which is continuously decreasing in size upon an operative cutting insert approaching the workpiece edge, is sheared off when the size thereof becomes so small that it can no longer resist cutting forces acting thereon. Thereby, the quality of the machined surface adjacent the workpiece edge is essentially deteriorated.

To reduce the above effect, there is provided a cutting insert having main and minor cutting edges which merge via a corner portion of a relatively large radius. As illustrated in FIGS. 1a and 1b, with the radius of the operative corner portion A being relatively large, a lead angle B at which the insert cutting edge C is inclined with respect to the workpiece face W is continuously reduced upon the cutting edge approaching the workpiece edge D. By virtue of this, cutting forces acting on the uncut portion E of the workpiece are reduced and the danger of 'chipping' is decreased.

It is the object of the present invention to provide a new cutting insert enabling a further diminishing of the 'chipping' effect and this without sacrificing the insert's service life.

SUMMARY OF THE INVENTION

In accordance with the present invention there is provided a cutting insert for use in a milling cutter for a face milling, the insert having upper, lower and side surfaces and at least one pair of main and minor cutting edges formed by the intersection between the upper surface and an adjacent side surface;

the cutting edges merging via a cutting corner portion of a relatively large radius, said corner portion being provided with a land formed at said upper surface of the insert, the land being inclined to the insert lower surface at an inclination angle which continuously varies from a negative value at an area of the corner portion adjacent the main cutting edge to a positive value at an area of the corner portion adjacent the minor cutting edge.

The continuous variation of the land inclination of the insert corner portion from a negative to a positive one differs from the common land design in cutting inserts of the specified kind, where the land, known as a K-land, is most often invariant and is inclined in such direction as to increase the effective wedge angle along the insert cutting edges in order to strengthen them. In the present invention, however, the land design is such that, during a cutting operation, when the insert corner portion approaches a workpiece edge and the size and, consequently, the strength of an uncut portion of the workpiece is continuously decreased, there is provided a continuous change of direction of cutting forces acting on the land of the corner portion and, therefore, on the uncut portion of the workpiece, whereby the danger of 'chipping' is essentially reduced. On the other hand, by virtue of the fact that the land has a positive inclination only along a part of the corner portion whilst along the remainder thereof the land is negative, it is ensured that the corner portion is maintained sufficiently strong.

Thus, with the cutting insert of the present invention, the fact that the corner portion has a large radius of curvature not only ensures the gradual reduction of the lead angle, upon the cutting corner approaching the workpiece edge, but also enables formation, on the rake surface of the corner portion, of a twistedly shaped land, whereby the 'chipping' effect can be essentially reduced.

Preferably, the distance between a central point of the corner portion and the minor cutting edge is less than the radius of the corner portion.

Preferably, the main cutting edge is oriented tangentially to and smoothly merges with the corner portion and is provided with a negative land, said land of the corner portion merging smoothly with said land of the main cutting edge. The minor cutting edge may also be provided with a land. When this land is positive, it merges smoothly with the positive land of the adjacent portion of corner portion.

BRIEF DESCRIPTION OF THE DRAWINGS

For a better understanding of the present invention and to show how the same may be carried out in practice reference will now be made to the accompanying drawings, in which

FIG. 2b is a cross-sectional view along the line II—II of the cutting insert shown in FIG. 2a;

FIG. 2c is a perspective view of the insert shown in FIG. 2a;

FIG. 2d is a side view of the insert shown in FIG. 2a;

FIG. 10 illustrates a side view of the cutting insert when the corner portion as in FIGS. 4 and 5 is disposed adjacent an edge of a workpiece being cut, such as shown in FIG. 1a.

DETAILED DESCRIPTION OF PREFERRED EMBODIMENTS

Figure 1A:
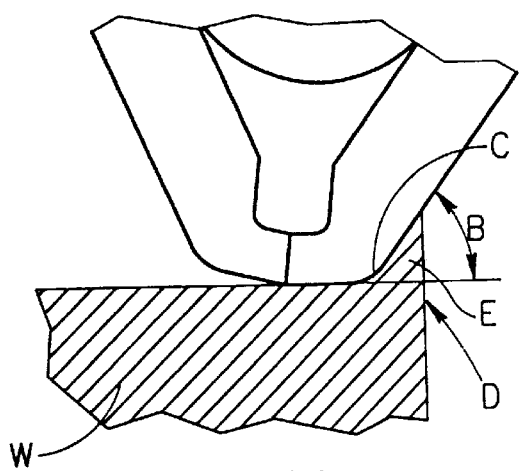
FIGS. 1a and 1b illustrate schematically a corner portion of a cutting insert of the kind to which the present invention refers at different moments of its approaching, during a cutting operation, an edge of a workpiece.
Figure 1B:
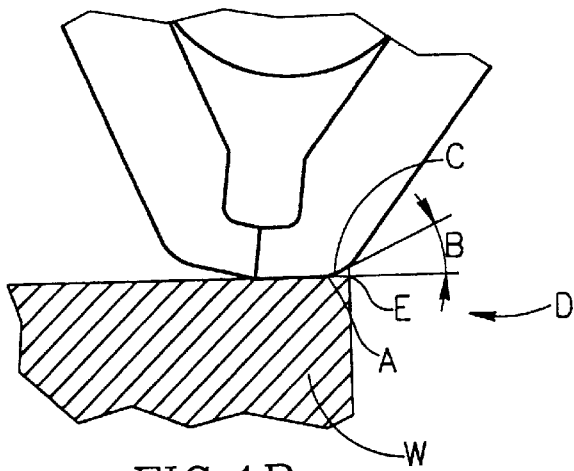

FIGS. 1a and 1b illustrate a corner portion A of a cutting insert of the kind to which the present invention refers, during the face milling of a workpiece W. It is shown in FIG. 1b how, due to a large radius of the corner portion A of the insert, a lead angle of inclination B of a cutting edge C of the corner portion A with respect to the workpiece face is reduced, relative to that shown in FIG. 1a, upon the cutting edge C approaching the workpiece edge D, thereby decreasing the 'chipping' effect at the edge D.

FIGS. 2a, 2b, 2c and 2d show a cutting insert 1 according to the present invention. As seen, the cutting insert 1 is double-sided and has a generally triangular shape with three identical indexable side edges 2, 3 and 4 at each side thereof, each side edge being formed at the intersection of an upper surface 5 or lower surface (not designated) with one of adjacent side surfaces 7. In view of the fact that all the side edges of the insert are identical, only one side edge, e.g. side edge 2, will be further described.

The side edge 2 is included between adjacent main insert corners 8 and comprises a substantially centrally disposed main cutting edge 10 merging at each side thereof with a minor cutting edge 11, an angle between the main cutting edge and an extension of the minor cutting edge being about 45°.

Figure 2A:
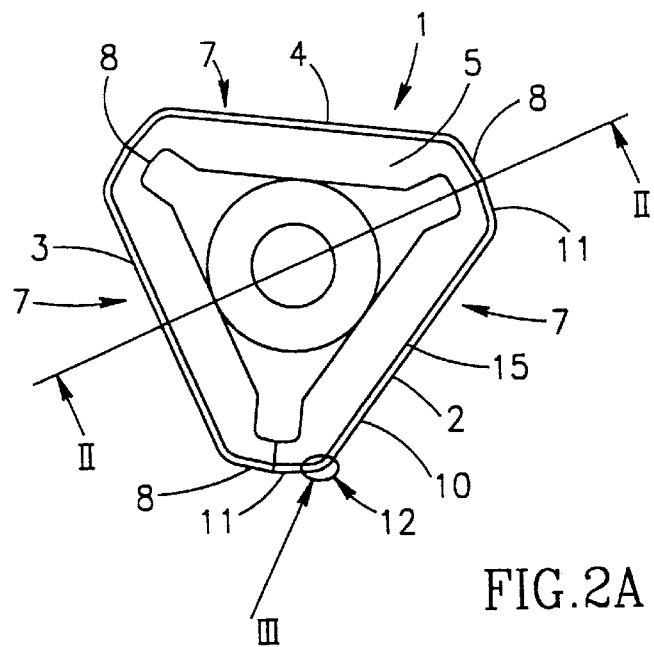
FIG. 2a is a plan view of a cutting insert according to the present invention.
Figure 2B:
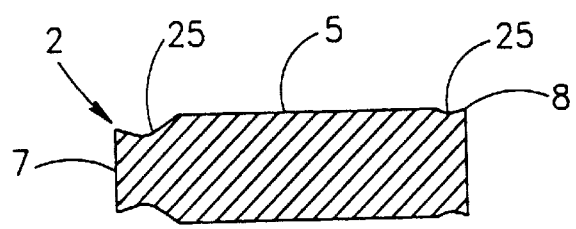
Figure 2C:
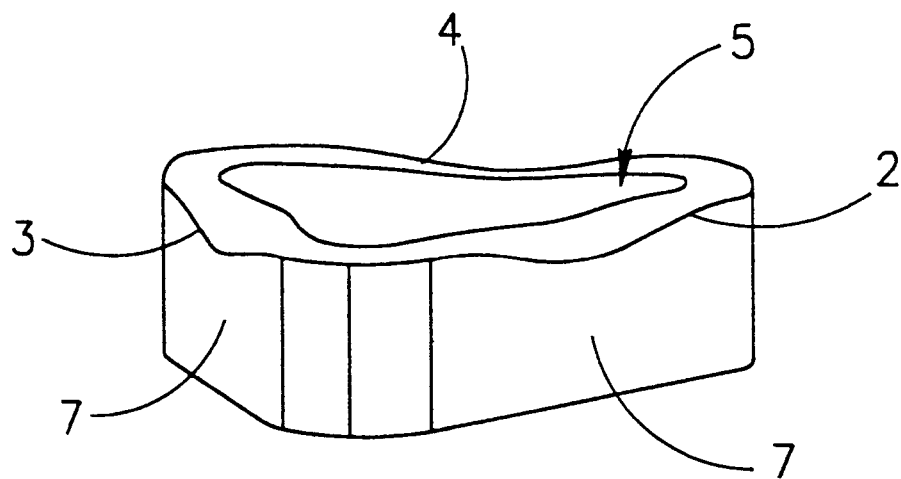
Figure 2D:
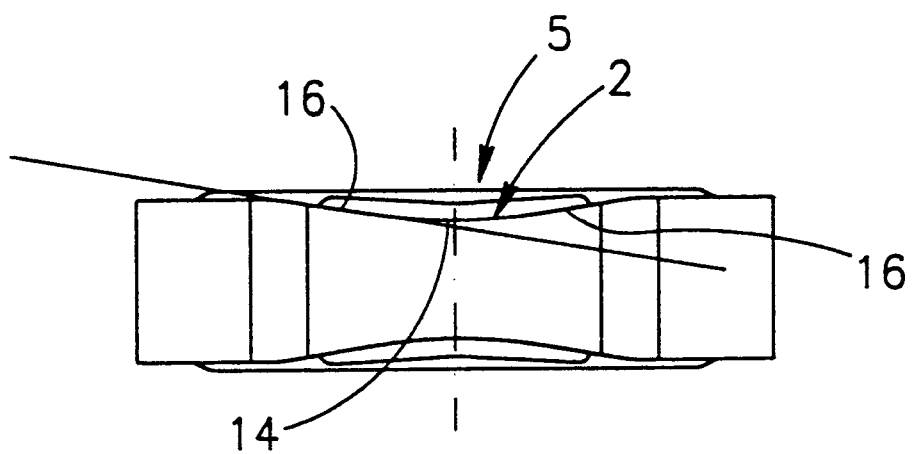

As seen in FIGS. 2c and 2d, each main cutting edge 10 is generally concave and comprises a central component cutting edge 14 and two lateral component cutting edges 16 which are straight and which slope towards the insert lower surface and towards the central component cutting edge 14. By virtue of the lateral component cutting edges being straight, there can be provided a constant, relatively large axial rake angle of the insert, when mounted in a tool.

Figure 3:
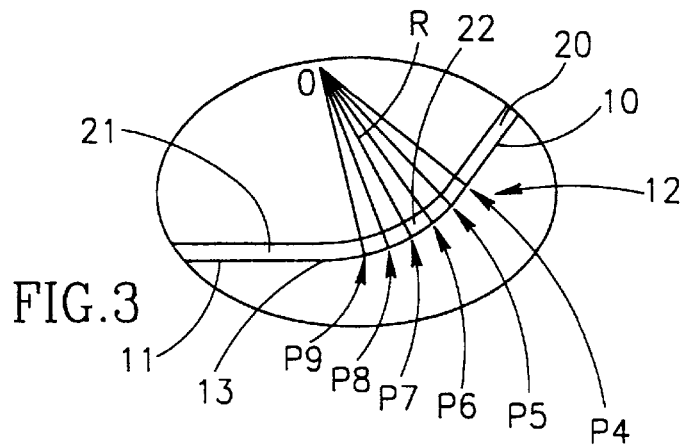
FIG. 3 is an area III of the cutting insert in FIG. 2a, shown on an enlarged scale.
Figure 4:
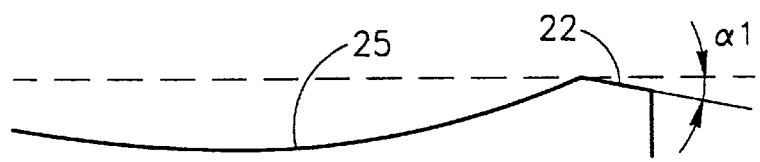
FIG. 4 is a cross-sectional view along a radial line connecting a center point O with point P4 of the corner portion, as shown in FIG. 3.
Figure 5:
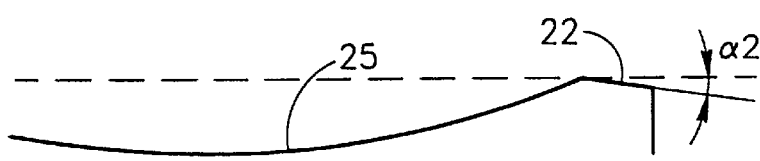
FIG. 5 is a cross-sectional view along a radial line connecting a center point O with point P5 of the corner portion, as shown in FIG. 3.
Figure 6:
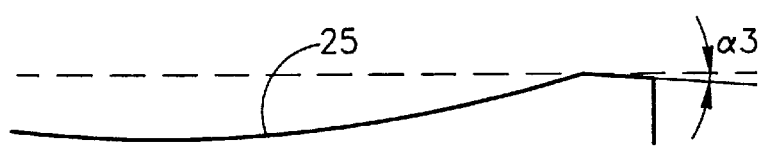
FIG. 6 is a cross-sectional view along a radial line connecting a center point O with point P6 of the corner portion, as shown in FIG. 3.

As seen in FIG. 2a and as better shown in FIG. 3, each minor cutting edge 11 merges with the main cutting edge via a cutting corner portion 12. The corner portion 12 is curved and has a radius R which is, preferably, greater than 0.5 mm. The main cutting edge 10 is directed tangentially with respect to the corner portion 12. The minor cutting edge 11 is preferably not tangential to the corner portion 12 and the distance between a central point O of the corner portion 12 and the minor cutting edge 11 is less than the radius R of the corner portion 12. Thereby it is ensured that, during a cutting operation, a chip cut by the main cutting edge and by the corner portion terminates at an area of the latter adjacent a point 13 of merger thereof with the minor cutting edge 11.

As seen in FIG. 3, the upper surface 5 of the cutting insert 1 has a land 15 comprising a land portion 20 formed along the main cutting edge 10, a land portion 21 formed along the minor cutting edge 11 and a land portion 22 formed along the corner portion 12.

Figure 7:
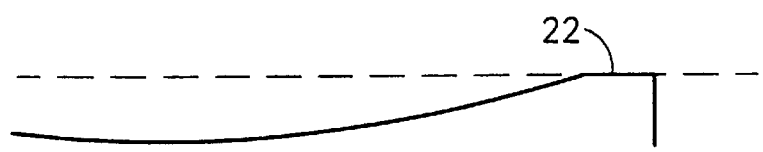
FIG. 7 is a cross-sectional view along a radial line connecting a center point O with point P7 of the corner portion, as shown in FIG. 3.
Figure 8:
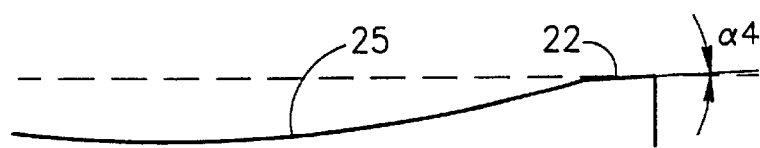
FIG. 8 is a cross-sectional view along a radial line connecting a center point O with point P8 of the corner portion, as shown in FIG. 3.
Figure 9:
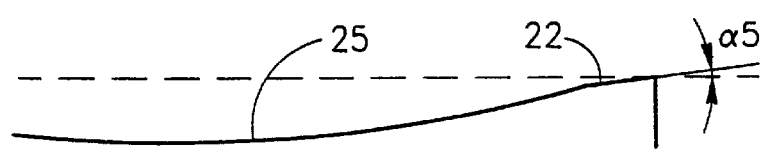
FIG. 9 is a cross-sectional view along a radial line connecting a center point O with point P9 of the corner portion, as shown in FIG. 3.

As seen in FIGS. 4 to 9 which illustrate cross-sectional views of the cutting insert 1 along the radial lines passing through a center point O of the cutting corner portion 12 and through points P4, P5, P6, P7, P8 and P9 thereof, an inclination angle α of the land 15 continuously varies from a negative value at points P4, P5 and P6 of the corner portion 12 adjacent the main cutting edge 10 (α1, α2, α3), to a positive value α4, α5 at points P8 and P9 of the corner portion 12 adjacent the minor cutting edge 11. FIG. 7 shows a neutral orientation of the land portion 22 at a transition area which is preferably located closer to the minor cutting edge 11 than to the main cutting edge 10. As seen in FIGS. 3–9, the land portion 22 is inclined widthwise in a direction transverse to the cutting corner portion 12, and so undergoes a twist between the main and minor cutting edges. To reinforce the main cutting edge 10, its land portion 20 is preferably negative and merges smoothly with the land-portion 22 of the corner portion. The land portion 21 of the minor cutting edge 11 can have any required inclination depending inter alia on the manner in which the insert is to be mounted in a tool. In the described embodiment, the land portion 21 of the minor cutting edge 11 is positive and merges smoothly with the land portion 22 of the corner portion 12.

As seen in FIG. 3, the land 15 has a width varying from a minimal value adjacent the main cutting edge 10 to a maximal value adjacent the minor cutting edge 11. The range of the land width is preferably from 0.05 to 0.35 mm.

As seen in FIGS. 2b and 4 to 9, the upper surface 5 of the cutting insert 1 is formed with a chip forming groove 25 sloping downwardly from the land 15 and extending along the entire perimeter of the insert. As seen in FIG. 2b, the chip forming groove 25 has its maximal depth along the main cutting edges and minimal depth at the insert main corners.

Figure 10:
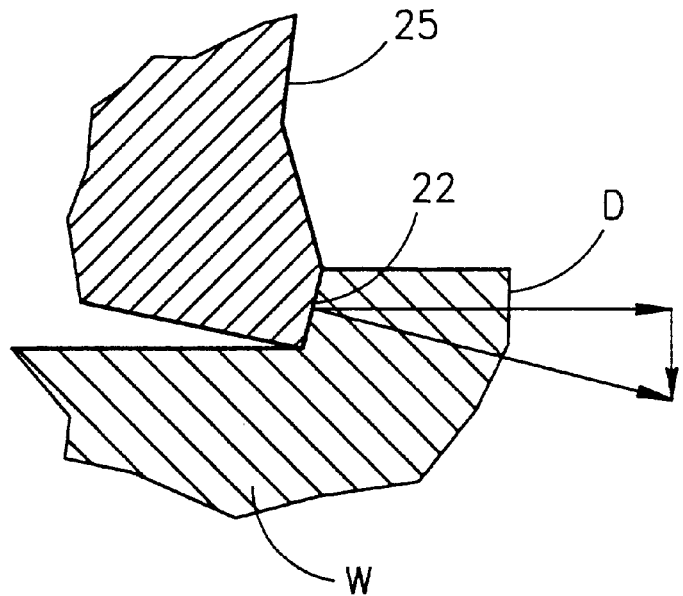
Figure 11:
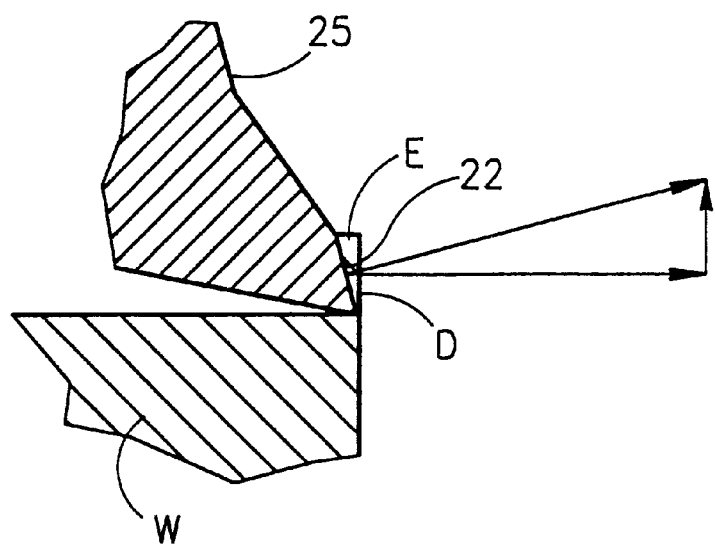
FIG. 11 illustrates a side view of the cutting insert when the corner portion as in FIGS. 8 and 9 is disposed adjacent an edge of a workpiece being cut, such as shown in FIG. 1b.

FIGS. 10 and 11 illustrate a partial side view of the cutting insert 1 at two different moments of cutting, when the corner portion 12 is approaching the edge D of the workpiece W being cut, such as shown in FIGS. 1a and 1b. Thus, FIG. 10 shows the moment when the area of the corner portion where the land portion 22 is negative, is disposed adjacent the workpiece edge D, and FIG. 11 shows the moment when the area of the corner portion where the land portion 22 is positive, is disposed adjacent the work-piece edge D. As seen, by virtue of the change of the land inclination from the negative to the positive one, the cutting force F and, in particular, its component F1 acting on the land 22 and, consequently, on the uncut portion E of the workpiece W change their direction, whereby it is provided that the point 13 of the corner portion can reach the edge D of the workpiece before the uncut portion E is detached therefrom.

The cutting insert according to the present invention and different features thereof described above may have a design different from that shown in the drawings. Thus, for example, the cutting insert need not necessarily be triangular and double-sided.

DESIGNATIONS USED IN THE DRAWINGS

W workpiece
A corner portion
B lead angle
C cutting edge
D edge of the workpiece
E uncut portion of the workpiece
1 cutting insert
2, 3, 4 indexable side edges of the insert
5 upper surface of the insert
7 side surfaces
8 main insert corners
10 main cutting edge
11 minor cutting edges
12 corner portion
13 point of merger of the corner portion 12 with the minor cutting edge 11
14 central component of the main cutting edge
15 land
16 lateral components of the main cutting edge 20 land portion of the main cutting edge 10
21 land portion of the minor cutting edge 11
22 land portion of the corner portion 12
25 chip forming groove

We claim:

1. A cutting insert for use in a milling cutter for a face milling, said insert having upper, lower and side surfaces and at least one pair of main and minor cutting edges formed by the intersection between the upper surface and an adjacent side surface;

the cutting edges merging via a cutting corner portion having a radius, said cutting corner portion being provided with a land formed at said upper surface of the insert;

said land having a width and being inclined widthwise to the insert lower surface at an inclination angle which continuously varies from a negative value at an area of the corner portion adjacent the main cutting edge to a positive value at an area of the corner portion adjacent the minor cutting edge.

2. A cutting insert according to claim 1, wherein the radius of the corner portion is centered about a central point of the corner position, and the distance between the central point of the corner portion and the minor cutting edge is less than the radius of the corner portion.

3. A cutting insert according to claim 1, wherein a transition area of the land between its negatively and positively inclined portions is located closer to the minor cutting edge than to the major cutting edge.

4. A cutting insert according to claim 1, wherein the main cutting edge is oriented tangentially to and smoothly merges with the corner portion and is provided with a negative land, said land of the corner portion merging smoothly with said land of the main cutting edge.

5. A cutting insert according to claim 1, wherein the minor cutting edge is provided with a positive land which merges smoothly with the positive land of the adjacent portion of corner portion.

6. A cutting insert for use in a milling cutter for a face milling, said insert having upper, lower and side surfaces and at least one pair of main and minor cutting edges formed by the intersection between the upper surface and an adjacent side surface;

the cutting edges merging via a cutting corner portion having a radius, said cutting corner portion being provided with a land having a width formed at said upper surface of the insert and merging with the corner portion;

said land sloping widthwise from an outer edge of the cutting corner portion at a continuously varying angle, upwardly at an area of the corner portion adjacent the main cutting edge and downwardly at an area of the corner portion adjacent the minor cutting edge.

7. A cutting insert according to claim 6, wherein the radius of the corner portion is centered about a central point of the corner portion, and the distance between the central point of the corner portion and the minor cutting edge is less than the radius of the corner portion.

8. A cutting insert according to claim 6, wherein a transition area of the land between its upwardly and downwardly sloped portions is located closer to the minor cutting edge than to the major cutting edge.

9. A cutting insert according to claim 6, wherein the main cutting edge is oriented tangentially to and smoothly merges with the corner portion and is provided with a negative land, said upwardly sloping land of the corner portion merging smoothly with said land of the main cutting edge.

10. A cutting insert according to claim 6, wherein the minor cutting edge is provided with a land which merges smoothly with the downwardly sloping land of the adjacent portion of corner portion.

\* \* \* \* \*